United States Patent
Piper (10) Patent No.: US 9,693,567 B2
(45) Date of Patent: Jul. 4, 2017

(54) DOUGH ROLLING SYSTEM

(71) Applicant: Kathleen Piper, Gurnee, IL (US)

(72) Inventor: Kathleen Piper, Gurnee, IL (US)

(73) Assignee: Kathleen Piper, Gurnee, IL (US)

( * ) Notice: Subject to any disclaimer, the term of this patent is extended or adjusted under 35 U.S.C. 154(b) by 142 days.

(21) Appl. No.: 14/705,313

(22) Filed: May 6, 2015

(65) Prior Publication Data

US 2015/0320054 A1    Nov. 12, 2015

Related U.S. Application Data (60) Provisional application No. 61/989,403, filed on May 6, 2014.

(51) Int. Cl.
*A21C 11/00* (2006.01)
*A21C 11/10* (2006.01)

(52) U.S. Cl.
CPC .......... *A21C 11/004* (2013.01); *A21C 11/008* (2013.01); *A21C 11/10* (2013.01)

(58) Field of Classification Search
CPC .................................................. A21C 11/008
USPC .............................. 269/302.1; 425/193, 374
See application file for complete search history.

(56) References Cited

U.S. PATENT DOCUMENTS

| | | | | |
|---|---|---|---|---|
| 2,521,982 A | * | 9/1950 | Kors | A21C 11/008 425/317 |
| 2,546,656 A | * | 3/1951 | Smith | A21B 3/15 249/117 |
| 2,650,552 A | * | 9/1953 | Wood | A21C 3/021 108/138 |
| 3,166,027 A | * | 1/1965 | Sprenzel | A21C 11/008 425/183 |
| 3,806,078 A | * | 4/1974 | Achzehner | C11C 5/023 249/155 |
| 3,867,501 A | * | 2/1975 | Powers | C11C 5/023 249/104 |
| 4,009,857 A | * | 3/1977 | Delmas | A21C 11/008 249/102 |
| 4,522,580 A | | 6/1985 | Poister | |
| 4,857,349 A | * | 8/1989 | Finlay | A21C 11/008 425/363 |
| 6,607,187 B1 | | 8/2003 | Adler | |
| 8,360,410 B1 | * | 1/2013 | Rockwood | A21C 11/00 269/289 R |
| 2005/0072317 A1 | * | 4/2005 | Thorstad | A47J 43/20 99/450.1 |

* cited by examiner

*Primary Examiner* — James Mackey
(74) *Attorney, Agent, or Firm* — Schwegman Lundberg & Woessner, P.A.

(57) ABSTRACT

Apparatus and methods for preparing rolled dough sheets are provided. In an example, a dough rolling system can include a rolling board having first and second major surfaces and a first plurality of grooves within the first major surface and a plurality of removable templates configured to insert within at least one groove of the first plurality of grooves, wherein the plurality of templates are configured to define a shape and a thickness for a final dough sheet.

15 Claims, 12 Drawing Sheets

DOUGH ROLLING SYSTEM

PRIORITY AND RELATED APPLICATIONS

This application claims the benefit of priority to U.S. Provisional Patent Application Ser. No. 61/989,403 filed on May 6, 2014, titled, "DOUGH ROLLING SYSTEM," which is hereby incorporated by reference herein in its entirety.

OVERVIEW

Apparatus and methods for preparing rolled dough sheets are provided. In an example, a dough rolling system can include a rolling board having first and second major surfaces and a first plurality of grooves within the first major surface and a plurality of removable templates configured to insert within at least one groove of the first plurality of grooves, wherein the plurality of templates are configured to define a shape and a thickness for a final dough sheet.

This overview is intended to provide a partial summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized example apparatus and methods for a rolling and shaping baking dough such as for pies and pastries. In certain examples, the system assists in providing rolled dough with relatively consistent thickness. In some examples, the thickness of the rolled dough can be selected using the system and methods. In some examples, the dough rolling system can assist in picking up, moving and placing the rolled dough for subsequent baking steps. In some examples, the dough rolling system can include templates for modifying a rolled dough layer, such as for providing decorative cutouts. In certain examples, the system can enable dough to be rolled to a specific shape and to a uniform thickness without the frustration and anxiety many bakers have when shaping and rolling out dough. Such a system can not only save aggravation but also save time. Providing rolled dough using the present system and methods can alleviate excessive handling of the dough and as a result the system can help preserve the texture and quality of the dough. Many different sizes of pies and pizzas can be made, along with crackers, shaped cookies and quiche crusts. With the addition of various depths of rigid rings, or shape and thickness templates, the thickness of the dough can be altered and the applications can be wide-ranging. In certain examples, the rolling board can be shaped into a circle, a rectangle or a square of various sizes to give additional options.

Figure 1A:
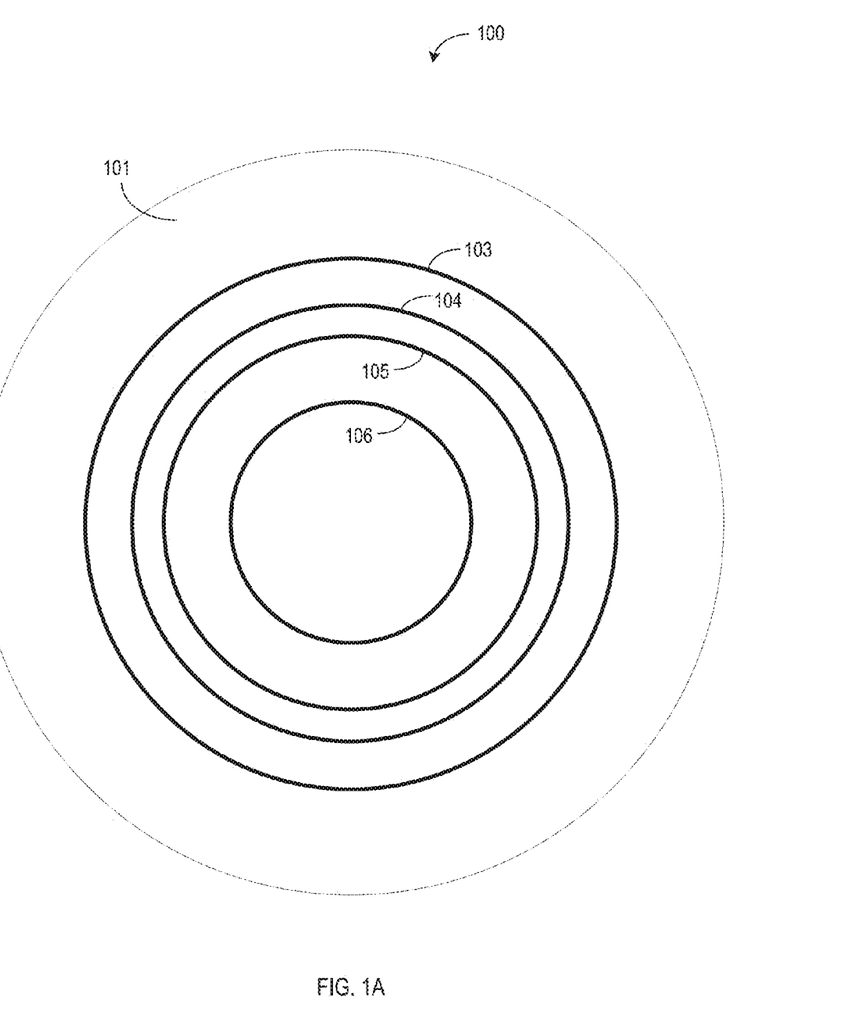
FIGS. 1A and 1B illustrate generally an example rolling board.
Figure 1B:
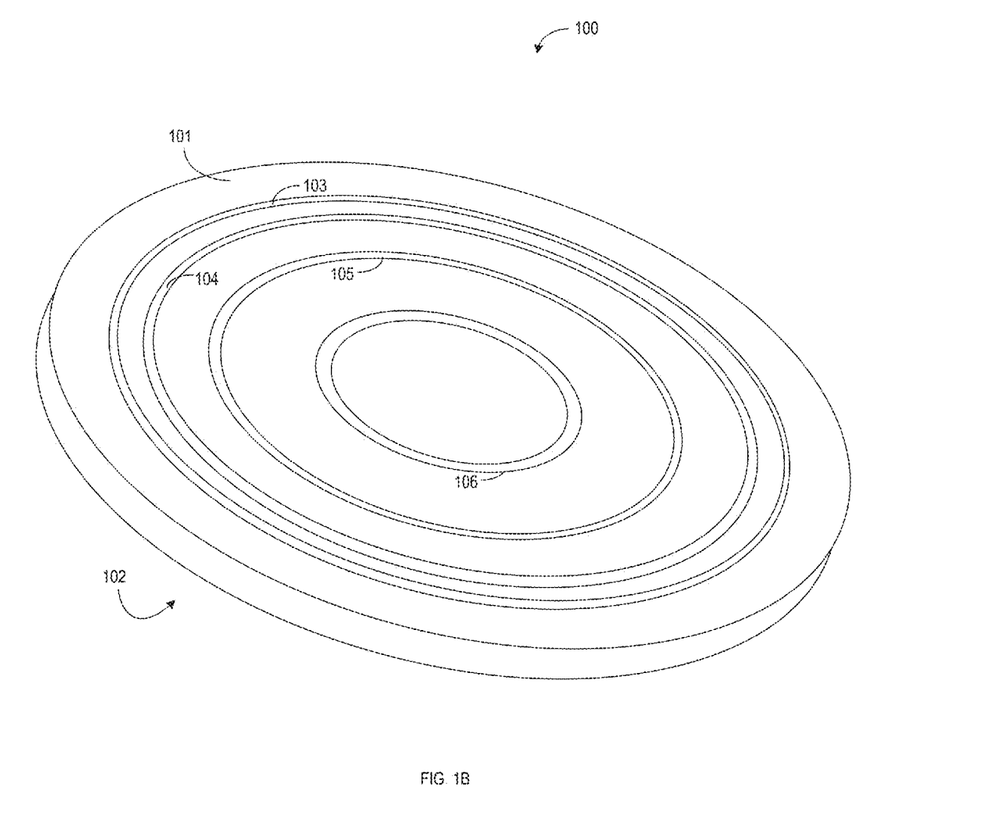

FIGS. 1A and 1B illustrate generally an example rolling board 100. In general, the rolling board 100 can be a rigid material such as, but not limited to, wood or plastic and includes two major surfaces 101, 102 opposite each other. In some examples, at least one major surface 101 includes one or more grooves 103, 104, 105, 106 for assisting in rolling and shaping dough, such as dough for baking, for example. In some examples, one of the major surfaces 102 can be plain such as for use as a cutting board. In certain examples, the cutting board surface can include a layer of durable material to extend the useful life of the cutting board surface.

Figure 2:
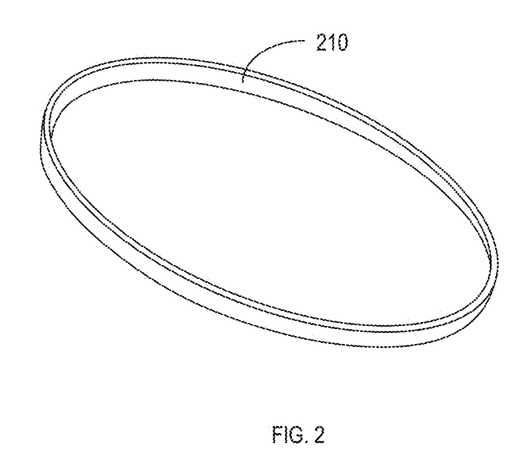
FIG. 2 illustrates generally an example shape and thickness template in the shape of a circle.

In certain examples, the one or more grooves 103, 104, 105, 106 can be shaped for circular pies, pastries and tarts, although other shapes are possible without departing from the scope of the present subject matter. In some examples, the more than one groove 103, 104, 105, 106 can be arranged to provide more than one size rolled dough product. FIG. 2 illustrates generally an example shape and thickness template 210 in the shape of a circle. The grooves 103, 104, 105, 106 are sized and shaped to receive a shape and thickness template, such as the shape and thickness template 210 of FIG. 2.

Figure 3:
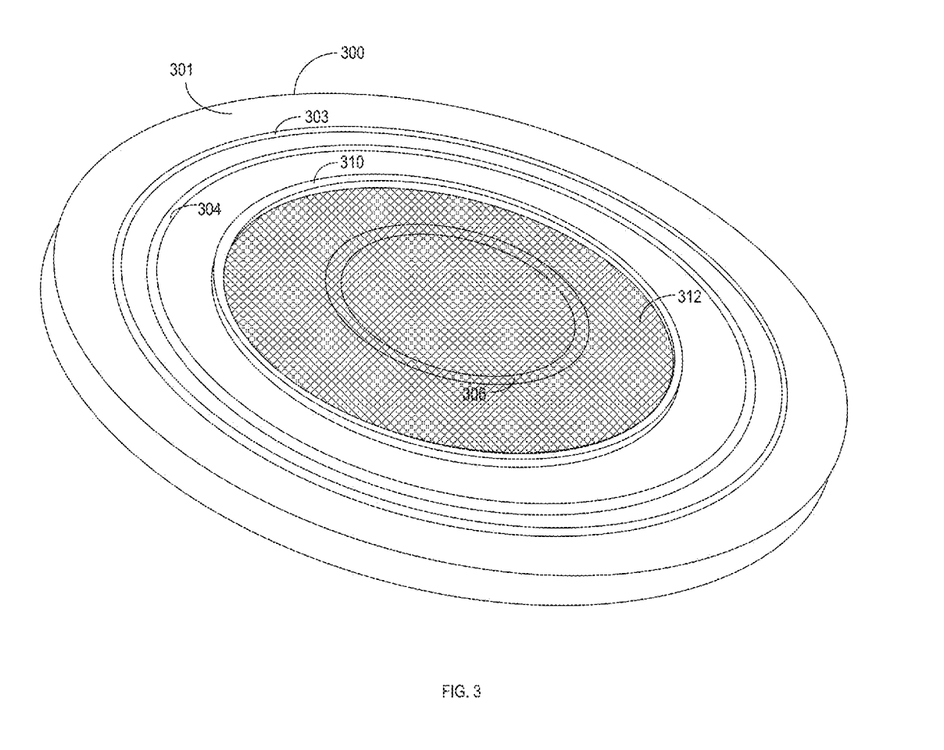
FIG. 3 illustrates generally an example rolling board with an example shape and thickness template inserted in to a groove of a plurality of grooves of the rolling board.

FIG. 3 illustrates generally an example rolling board 100 with an example shape and thickness template 310 inserted in to a groove of a plurality of grooves 303, 304, 306 of the rolling board 300. Each shape and thickness template can seat securely in a corresponding groove and can extend above the surface 301 of the rolling board 300 by a predetermined length. The predetermined length can provide a thickness template. For example, once the shape and thickness template 310 is inserted in a groove, dough can be rolled within the shape formed by the groove and the inserted shape and thickness template 310. As the dough is thinned by the rolling process (e.g. rolling pin), a portion of shape and thickness template 310 that protrudes from the surface 301 of the rolling board 300 can prevent the rolling pin from thinning the dough beyond a certain thickness. In addition, as the dough is thinned, portions of the dough can extend beyond the shape and thickness template 310 and can be separated from the dough of interest as the rolling pin contacts the shape and thickness template 310. The rolling process can be complete when the rolling pin can be rolled along the shape and thickness template 310 and no longer rolls the dough of interest within the interior of the shape and thickness template 310 and any excess dough has been separated from the dough of interest within the interior of the shape and thickness template 310.

Upon completion of the rolling process, the shape and thickness template can be removed from the corresponding groove of the rolling board to allow access to the rolled dough. In certain examples, the rolling board can include a cut-out in the side of a groove or in the opposite major surface to allow a tool, such as a skewer or fork, to be used to pry the shape and thickness template from the groove or to push the shape and thickness template from the groove.

In certain examples, prior to placing the dough on the rolling board 301 a dough support layer 312 can be placed on the rolling board 300 within the interior of the shape and thickness template 310. In certain examples, the dough support layer 312 can be a thin sheet of plastic or paper product such as cardboard. In some examples, the dough support layer has some rigidity to support a cantilevered portion of the dough upon removal from the rolling board 300. Upon completion of the rolling process and removal of the shape and thickness template 310, the dough support layer 312 can assist in picking up the rolled dough, moving the rolled dough to another location and placing the rolled dough at the other location, such as moving the rolled dough to a pie pan and placing the rolled dough in the pie pan. In certain examples, the dough support layer 312 can have a low friction surface that allows the rolled dough to be easily slid off the dough support layer 312 such as for placing the rolled dough in a pie pan or pastry pan. In certain examples, a low friction surface of the dough support layer 312 can assist in allowing the dough to "roll out" during the rolling process. In certain examples, parchment paper can be used on dough support layer 312 to allow the rolled dough and parchment paper to be slid onto a baking pan or sheet.

Figure 4A:
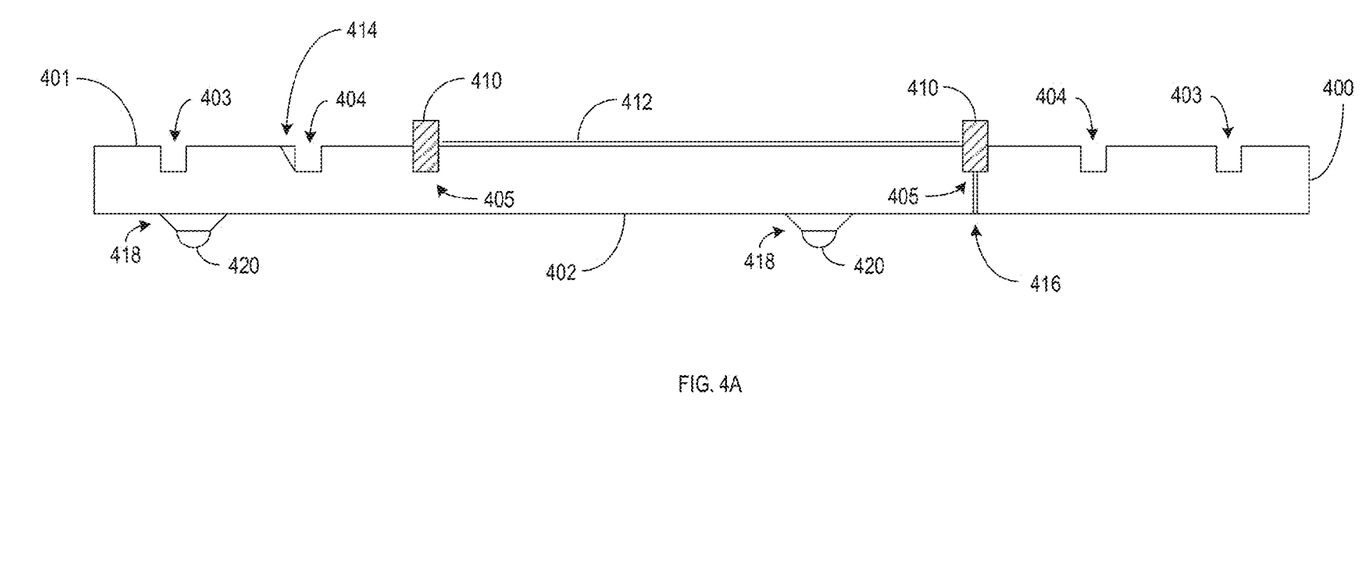
FIG. 4A illustrates generally a cross-section of an example rolling board.

FIG. 4A illustrates generally a cross-section of an example rolling board 400, shape and thickness template 410, and dough support layer 412. In certain examples, the rolling board 400 can include two major surfaces 401, 402 opposite each other. In certain examples, the rolling board 400 can include one or more grooves 403, 404, 405 extending into the rolling board 400 from the first major surface 401. In certain examples, a rolling board kit can include a shape and thickness template for each groove of the rolling board, such as the shape and thickness template 412 shown inserted in a corresponding groove 405 of the rolling board 400. In certain examples, a rolling board kit can include a number of dough support layers, each corresponding to a particular groove and a particular shape and thickness template, such as the dough support layer 412 corresponding to groove 405 and shape and thickness template 410. In some examples, a kit may include more than one shape and thickness template each template having a different height, to provide various thickness templates for a particular groove. In certain examples, a notch 414 can optionally be associated with a groove 404. The notch 414 can allow a tool such as a fork tine or skewer to be used to remove a shape and thickness template from the groove 404. In certain examples, a via 416 can couple the bottom of a groove 405 with the second major surface 402. The via 416 can allow a tool to be inserted from the second major surface 402. The tool can then be used to eject a shape and thickness template 410 from the corresponding groove 405. In certain examples, the rolling board can include grooves in the first major surface 401 and the second major surface 402. In such a configuration, a single template can provide a first dough thickness when used in a corresponding groove of the first surface and can provide a second dough thickness different from the first dough thickness when used in a a corresponding groove of the second major surface.

In certain examples, the rolling board 400 can optionally include three or more caster assemblies 418 coupled to the second major surface 402 to allow the rolling board to be easily rotated or moved about a counter. In certain examples, the caster assemblies 418 can include wheels or retained spheres 420.

Figure 4B:
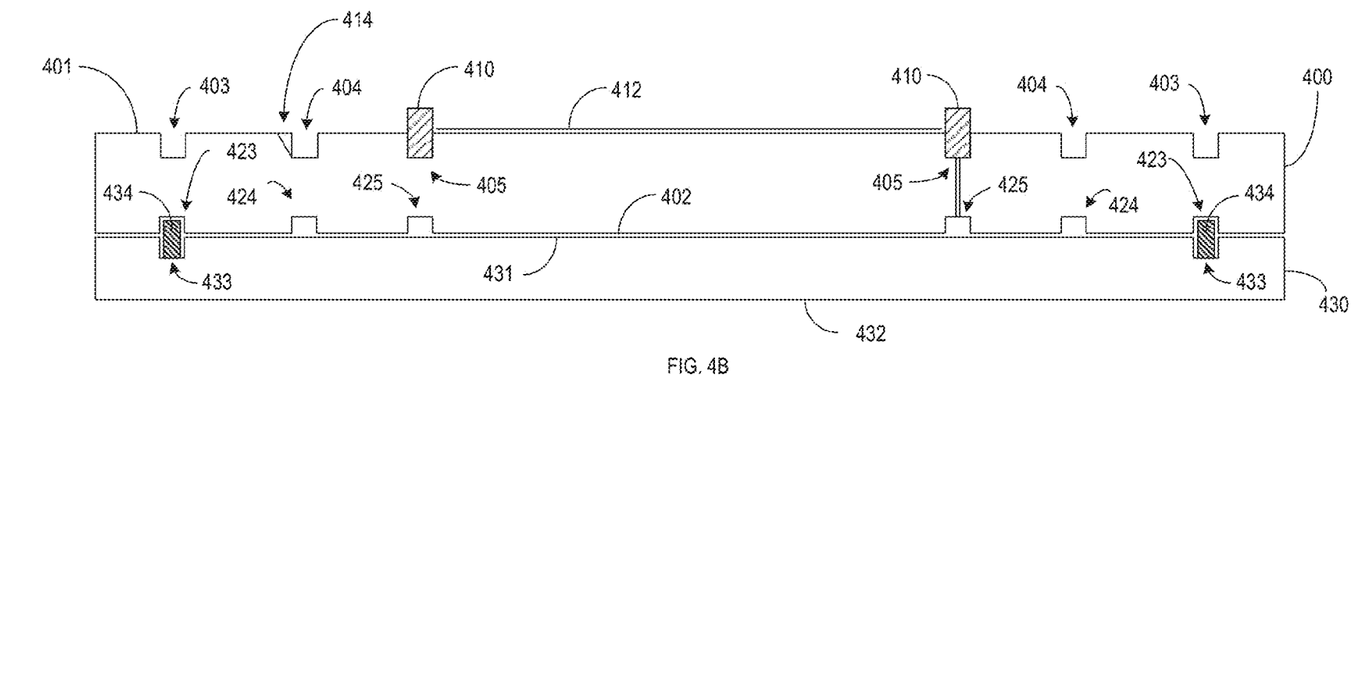
FIG. 4B illustrates generally a cross-section of an example rolling board with an alternative base.

FIG. 4B illustrates generally a cross-section of an example rolling board 400 with an alternative base 430 that allows rotation of the rolling board 400 while maintaining the relative position of the rolling board 400 on a countertop for example. The example rolling board 400 can include grooves on both major surfaces 401, 402. In certain examples, the grooves 423, 424, 425 within the second major surface 402 can correspond in size to the grooves 403, 404, 405 in the first major surface 401. In certain examples, the depth of the grooves 423, 424, 425 within the second major surface 402 of the rolling board 400 can have a different depth than the groves 403, 404, 405 in the first major surface 401. Such an arrangement can allow the thickness templates 410 to be reused to provide a second dough thickness when used with the grooves 423, 424, 425 in the second major surface 402.

In certain examples, the base 430 can include a bottom surface 432 that can resist slipping on a countertop. In certain examples, the base 430 can include an upper surface 431 that can be low friction and can allow the rolling board 400 to be easily moved around when the rolling board 400 sits atop the base 430. In certain examples, the upper surface 431 can include a guide groove 433 that corresponds to a groove of at least one of surfaces 401, 402 of the rolling board 400. In certain examples, a guide ring 434 can be inserted into the guide groove 433 and when the corresponding groove 423 of the rolling board 400 is aligned with the guide ring 434, the rolling board 400 can sit atop the base 430, and the guide ring 434 can allow the rolling board 400 to rotate but maintain relatively centered on the base 430. This allowed movement can assist a user as the dough is rolled out and flattened to the extremes of a thickness template 410. Without the base 430, there is always the opportunity for the rolling board 400 to not remain optimally positioned relative to the user as the user rolls the dough and rotates the rolling board.

It is understood that the guide ring can be configured for any one of the grooves of the rolling board without departing from the scope of the present subject matter. In certain examples, instead of a guide ring, a guide pin can be provided that resides in a hole of the base and is extends into a hole at or near a center position of the underside of the rolling board when the rolling board is set upon the base. The guide pin or guide ring is not configured to bear weight of the rolling board. The guide pin or guide ring is configured allow rotational movement of the rolling board relative to the base but to limit lateral movement of the rolling board relative to the base.

Figure 5A:
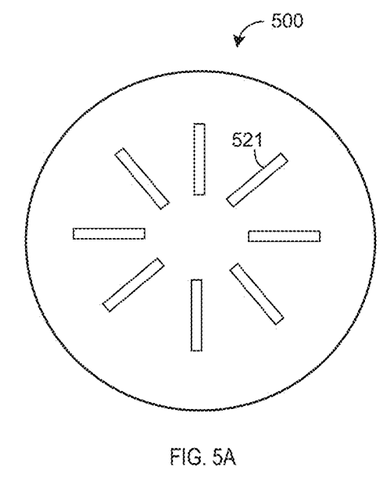
FIGS. 5A-D illustrate generally example dough support layers that include decorative cut-outs.
Figure 5B:
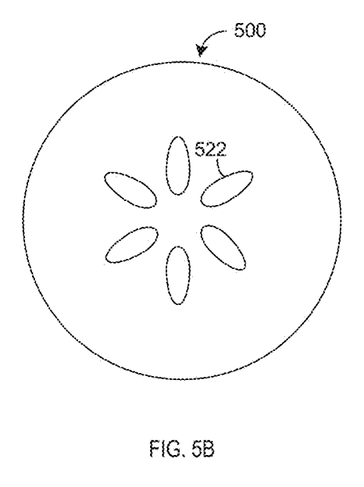
Figure 5C:
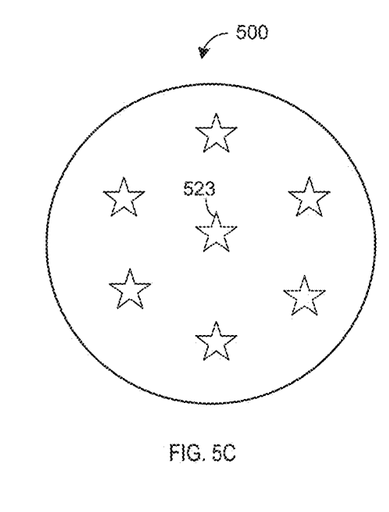
Figure 5D:
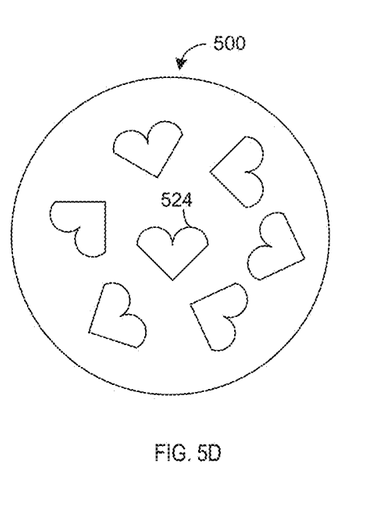
Figure 6:
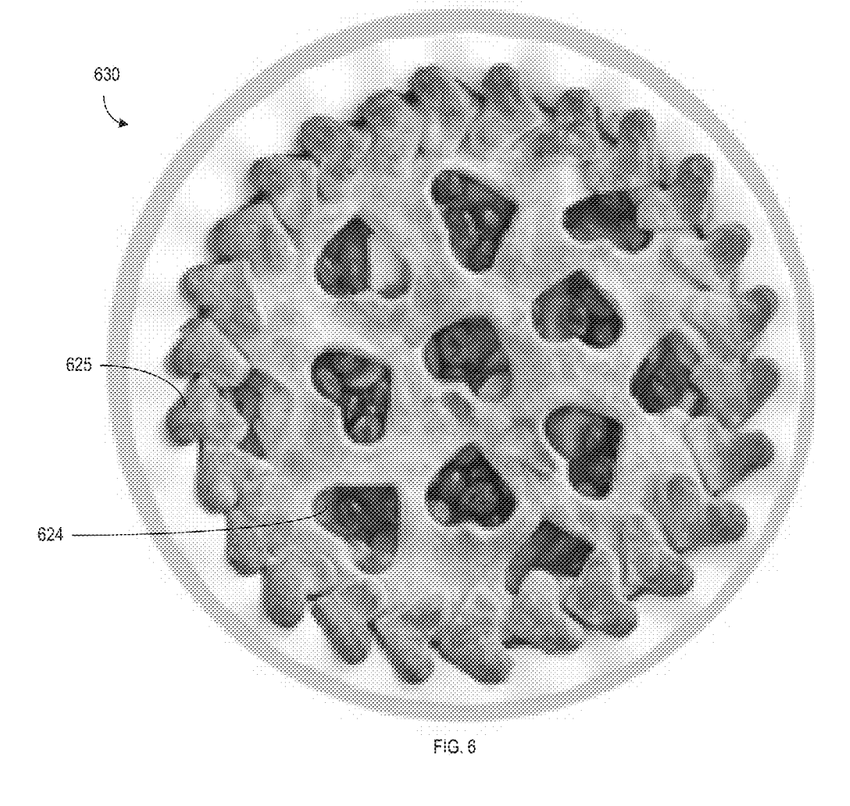
FIG. 6 illustrates generally a top-view of a pie having a decorative top crust.

FIGS. 5A-D illustrate generally example dough support layers that include decorative cut-outs. FIG. 5A illustrates generally an example dough support layer 500 including rectangular cut-outs 521 radiating from a center point. FIG. 5B illustrates generally an example dough support layer 500 including oval-shaped cutouts 522 radiating from a center point. FIG. 5C illustrates generally an example dough support layer 500 including star cut-outs 523. FIG. 5D illustrates generally an example dough support layer 500 including heart-shaped cut-outs 524. It is understood that a dough support layer can include other shaped cut-outs without departing from the scope of the present subject matter. In certain examples, the cut-outs of the dough support layer can emboss the cut-out shapes on rolled dough when the dough support layer is used as described above with a rolling board. Upon cooking the dough, the shapes may be visible through a clear pie dish for example to add a decorative touch to a pie or pastry. The dough support layers 500 including the cut-outs 521, 522, 523, 524 can also be used as a template for a top crust of a pie or pastry. FIG. 6 illustrates generally a top-view of a pie 630 having a decorative top crust where the decorative cut-outs 624 can be formed using a dough support layer such as that shown in FIG. 5D. In addition, the cut-out dough 525 can be used to decorate a different portion of the pie or pastry such as the outer perimeter of the upper crust of a pie 630 as shown in FIG. 6. In certain examples, a rolling board kit can include one or more dough support layers including cut-outs.

Figure 7:
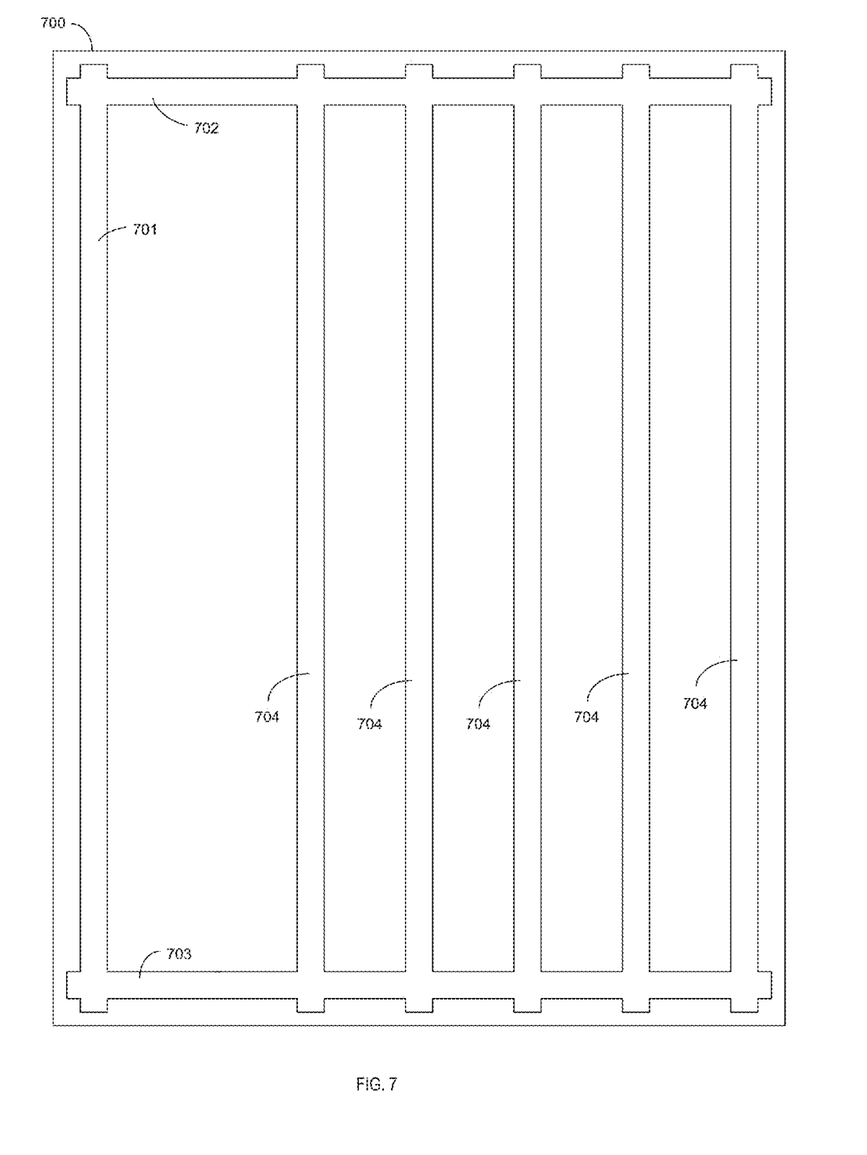
FIG. 7 illustrates general an example rolling board for making square or rectangular dough sheets of a particular thickness.

FIG. 7 illustrates general an example rolling board 700 for making square or rectangular dough sheets of a particular thickness. The rolling board 700 can include a number of straight grooves including base width groove 701, a pair of length grooves 702, 703 oriented at 90 degrees to the base width groove 701, and a plurality of additional width grooves 704 oriented in parallel with the base width groove 701. The plurality of grooves 701, 702, 703, 704 can accept insertion of interlocking template bars that can define an area. A user can place dough in the area and can roll the dough using a rolling pin, for example. As the dough flattens and rolls out under the pressure of the rolling pin, the rolling pin can engage the tops of the template bars and sever the dough such that a final dough sheet remains in the area defined by the template bars. The height of the template bars that extend out of the grooves 701, 702, 703, 704 and above the surface of the rolling board 700 can define the nominal thickness of the final dough sheet. To eliminate damaging the final dough sheet, the template bars can be removed and the final dough sheet can be slid from the surface of the rolling board 700.

Figure 8A:
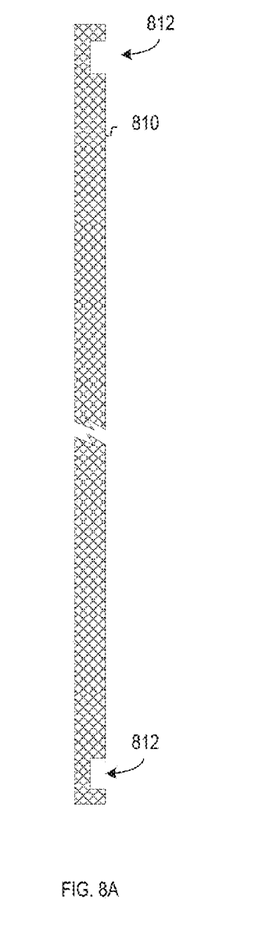
FIG. 8A illustrates generally an example of a width template bar that can be inserted in to one of the plurality of width grooves of the rolling board of FIG. 7.

FIG. 8A illustrates generally an example of a width template bar 810 that can be inserted in to one of the plurality of width grooves of the rolling board of FIG. 7. In some applications, at least one pair of width bars 810 are used and inserted in, for example, the base width groove and one of the addition width grooves.

Figure 8B:
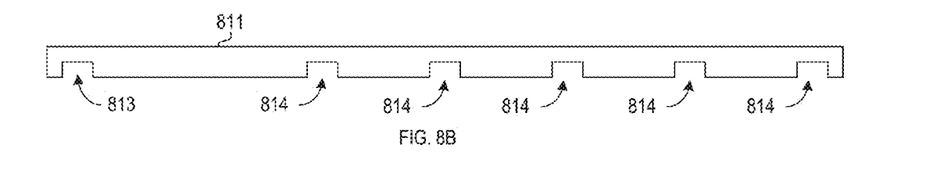
FIG. 8B illustrates generally an example of a length template bar that can be inserted in to one of the length grooves of the rolling board of FIG. 7.

FIG. 8B illustrates generally an example of a length template bar 811 that can be inserted in to one of the length grooves of the rolling board of FIG. 7. In some application, at least one pair of length template bars 811 are used and inserted in the two length grooves of the rolling board of FIG. 7.

The template bars 810, 811 of FIGS. 8A and 8B include notches 812, 813, 814 that allow the bars to interlock when inserted into appropriate grooves of the rolling board and to define a closed area. As discussed above, dough can be rolled within the closed area and a final dough sheet having the shape of the closed area and with a particular thickness. In certain examples, the particular thickness can be defined by a combination of the height of the template bars and the depth of the rolling board grooves that accommodate the template bars.

Figure 9A:
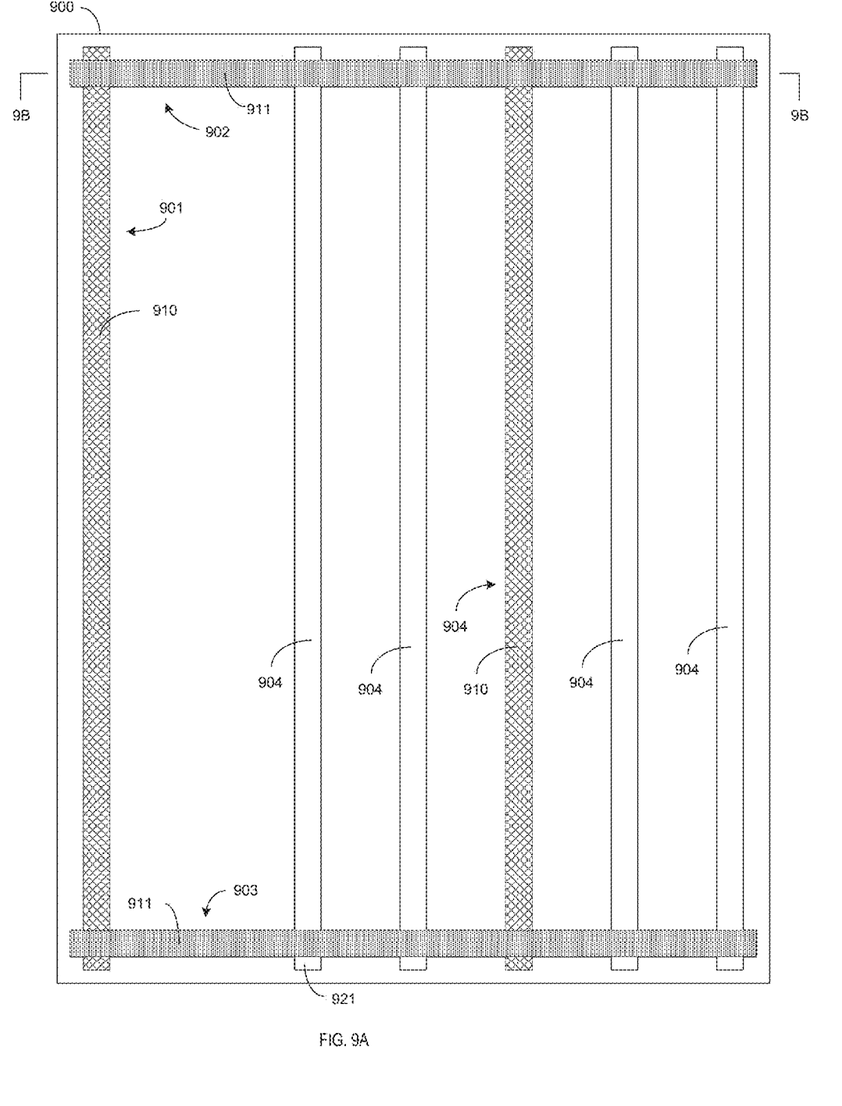
FIG. 9A illustrates general an example rolling board with example template bars inserted into some of the plurality of grooves of the rolling board.

FIG. 9A illustrates general an example rolling board 900 with example template bars 910, 911 inserted into some of the plurality of grooves 901, 902, 903, 904 of the rolling board 900. The assembled rolling board can include a base width bar 910 inserted in a left most width groove 901, a pair of length bars 911 inserted in the length grooves 902, 903, and an adjustable width bar 910 inserted in one of the additional width grooves 904. In this example, the width bars 910 are inserted with the notches (FIG. 8, 812) facing up, and the length bars 911 are inserted in the grooves with the notches (FIG. 8, 813) facing down such that the corresponding notches 812, 813 interface. In certain examples, prior to placing dough on the rolling board 900 in the area 920 defined by the interlocked template bars 910, 911, a dough support layer, such as a thin plastic sheet, can be placed in the area. In certain examples, the dough support layer is coextensive with the area 920 defined by the interlocked template bars 910, 911. During the rolling of the dough, the dough support layer can prevent the dough from embedding into grooves (e.g., 904) located within the area 920 defined by the interlocked template bars 910, 911 and can provide a flat bottom surface for the dough. Upon completion of the rolling of the dough, the ends 921 of the unoccupied width grooves 904 can provide a location to place a tool to assist in removing the template bars 911 from the grooves. Upon removal of the template bars 910, 910, the dough can be removed from the rolling board 900, for example, by sliding the dough support layer, with the final dough sheet atop, off of the rolling board. In certain example, the dough support layer can include a non-stick surface, such that the dough can easily slide off of the dough support layer and into a baking utensil such as a pan.

Figure 9B:
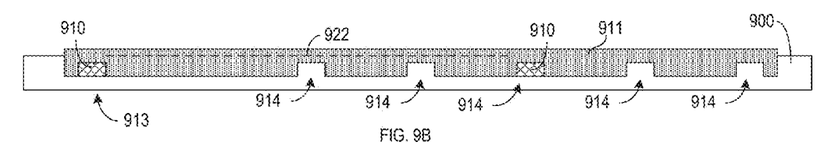
FIG. 9B illustrates generally a cross section of length bar interlocked with the width bars as illustrated in FIG. 9A.

FIG. 9B illustrates generally a cross section of length bar interlocked with the width bars as illustrated in FIG. 9A. FIG. 9B also shows a relative position of a dough support layer 922 with respect to the template bars and the rolling board. It is under stood that a dough support layer 922 would not typically be visible in such a cross section as it would lie within the area defined by the interlocked template bars 910, 911.

Figure 10:
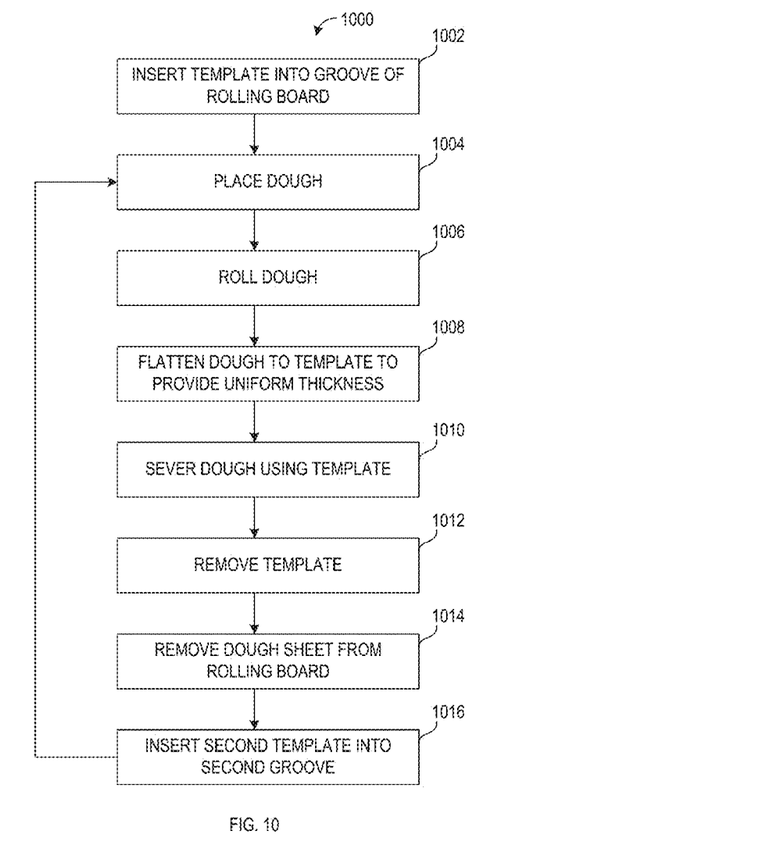
FIG. 10 is a flow chart of an example method for using an example rolling board as described above.

FIG. 10 is a flow chart of an example method 1000 for using an example rolling board as described above. At 1002, a first template can be inserted into one or more first grooves of a rolling board. At 1004, dough can be placed within an area defined by the template. At 1006 and 1008, the dough can be rolled to fill the area using a rolling device such as a rolling pin and flattened until the rolling device contacts a portion of the template extending above a surface of the rolling board to provide a uniform dough thickness within the area. At 1010, the dough can be severed using the interface of the rolling device with the template. At 1012, the template can be removed from the one or more grooves of the rolling board. At 1014, a first completed dough sheet having the uniform dough thickness can be removed without substantial handing of the dough sheet. At 1016, a second template can be inserted in to a second one or more groove to begin preparing a second completed dough sheet of a different size or a different dough thickness than the first completed dough sheet. In certain examples, a dough support layer can be placed within the area defined by the template to assist in handling the completed dough sheet and to isolate unoccupied groove within the area from filling with dough during the rolling process. In certain applications, templates as discussed above with respect to FIGS.

1-10 can allow dough to be rolled into a shape with a uniform thickness of ¹⁄₁₆ inch or less. Dough sheets or shapes with such thin thickness can be very difficult and time consuming to generate even for experienced bakers. The present subject matter allows such dough sheets and shapes to be generated with much less difficulty and in relatively much less time. In certain examples, the dough support sheets discussed above and the removable template or template bars allow dough sheets to be moved from the rolling board to other locations with ease and minimal if any damage or distortion.

In some applications, a rolling board kit can provide tools for making baked goods or pastry dough crusts of a predetermined thickness, a predetermined shape and a predetermined size. In certain examples, a kit can provide tools for making and handling baked goods or pastry dough crusts of a predetermined thickness, a predetermined shape and a predetermined size. In some examples, a kit can provide tools for making, handling and decorating baked goods or pastry dough crusts of a predetermined thickness, a predetermined shape, and a predetermined size.

Additional Notes

In Example 1, a dough rolling system can include a rolling board having first and second major surfaces and a first plurality of grooves within the first major surface, and a plurality of removable templates configured to insert within at least one groove of the first plurality of grooves, wherein the plurality of removable templates are configured to define a shape and a thickness for a final dough sheet.

In Example 2, the dough rolling system of Example 1 optionally includes a dough support layer coextensive with the shape of the final dough product, wherein the dough support is configured to support the final dough sheet when removed from the rolling board.

In Example 3, a first groove of the plurality of grooves of any one or more of Examples 1-2 optionally forms a first loop shape, a first removable template of the plurality of removable templates of any one or more of Examples 1-2 optionally form the first loop shape and is configured to fit within the first groove and to extend from a bottom of the first groove, below the first major surface, to a first height above the first major surface, and wherein the first height defines a first thickness for the final dough sheet.

In Example 4, the first loop shape of any one or more of Examples 1-3 optionally is a circle.

In Example 5, the first loop shape of any one or more of Examples 1-3 optionally includes at least three sides and at least three corners.

In Example 6, the rolling board of any one or more of Examples 1-5 optionally includes a second plurality of grooves within the second major surface, wherein the first removable template is configured to fit within a first groove of the second plurality of grooves and to extend from a bottom of the first groove of the second plurality of grooves, below the second major surface, to a second height above the second major surface; and wherein the second height defines a second thickness for the final dough sheet.

In Example 7, the first plurality of grooves of any one or more of Examples 1-3, 5 and 6 optionally are straight and wherein a plurality of length grooves of the first plurality of grooves define a length of the final dough sheet and a plurality of width grooves of the first plurality of grooves lie perpendicular to the plurality of length grooves and define a width of the final dough sheet.

In Example 8, a first removable template of the plurality of removable templates of any one or more of Examples 1-3 and 5-7 optionally defines a square or rectangular shape and includes a base width bar configured to insert within a first grove of the plurality of width grooves, a pair of length bars, each having a notch at a first end configured to interface with the base width bar, the pair of length bars configured to insert within a first length grove and a second length groove of the plurality of length grooves to define a length of the final dough sheet and an adjustable width bar configured to insert into one width groove of a remaining plurality of width grooves not occupied by the base width bar and to define a width of the final dough sheet in association with the base width bar, and wherein each of the pair of length bars include a plurality of notches, each notch associated with a particular width of the final dough sheet and configured to interface with a corresponding notch of the adjustable width bar for the particular width.

In Example 9, a height of each bar of the first removable template that extends above the first major surface when each bar is inserted within the first plurality of grooves of any one or more of Examples 1-8 optionally determines the thickness of the final dough sheet.

In Example 10, the dough rolling system of any one or more of Examples 1-9 optionally includes a dough support layer coextensive with the length and the width of the final dough sheet, the dough support layer configured to support the final dough sheet while the final dough sheet is prepare and isolate dough from each of the remaining plurality of width grooves that are within the area defined by the base width bar, the pair of length bars and the adjustable width bar.

In Example 11, the rolling board of any one or more of Examples 1-10 optionally includes a second plurality of grooves within the second major surface.

In Example 12, a first template of the plurality of removable templates of any one or more of Examples 1-11 optionally is configured to define a first dough thickness when inserted within a first groove of the first plurality of grooves and to define a second dough thickness when inserted within a first groove of second plurality of grooves, and wherein the first dough thickness is different than the second dough thickness.

In Example 13, except for the groves, the first major surface of any one or more of Examples 1-12 optionally is substantially flat.

In Example 14, a method for rolling dough can include inserting a template in at least one groove of a first plurality of grooves of a rolling board, the rolling board having first and second major surfaces and the first plurality of grooves within the first major surface, placing dough on the rolling board within an area defined by the template, rolling the dough to a predefined thickness with a rolling mechanism until the rolling mechanism severs the dough using the template to provide a final dough sheet within the area defined by the template, wherein the predefined thickness is determined by a portion of the template protruding from the first major surface, and removing the template to allow removal of the final dough sheet from the rolling board.

In Example 15, the method of any one or more of Examples 1-14 optionally includes placing a dough support layer under the dough and within the area defined by the template.

In Example 16, the rolling the dough of any one or more of Examples 1-15 optionally includes isolating the dough from penetrating remaining grooves, of the plurality of grooves, within the area defined by the template using the dough support layer.

In Example 17, the method of any one or more of Examples 1-16 optionally includes removing the final dough sheet from the rolling board using the dough support layer.

In Example 18, the first plurality of grooves of any one or more of Examples 17 optionally are straight, a plurality of length grooves of the first plurality of grooves optionally define a length of the final dough sheet and a plurality of width grooves of the first plurality of grooves lie perpendicular to the plurality of length grooves and define a width of the final dough sheet, and the inserting the template of any one or more of Examples 1-17 optionally includes inserting a base width bar within a first grove of the plurality of width grooves, inserting a pair of length bars within a first length grove and a second length groove of the plurality of length grooves to define a length of the final dough sheet, and inserting an adjustable width bar into one width groove of a remaining plurality of width groves not occupied by the base width bar to define a width of the final dough sheet in association with the base width bar.

In Example 19, each length bar of the pair of length bars optionally have a first notch at a first end, and the inserting the pair of width bars of any one or more of Examples 1-18 optionally includes interfacing the first notch at the first end of each width bar with a corresponding notch of the base width bar.

In Example 20, each length bar of the pair of length bars optionally include a plurality of second notches, each second notch associated with a particular width of the final dough sheet, and the inserting the adjustable width bar of any one or more of Examples 1-19 optionally includes interfacing a corresponding notch of the adjustable width bar with one second notch of the plurality of second notches of each length bar of the pair of length bars.

In Example 21, a dough rolling kit can include a rolling board having a plurality of grooves extending in to the rolling board from a first major surface, a plurality of shape and thickness templates, each shape and thickness template configured for insertion within at least one groove of the plurality of grooves, and each shape and thickness template having a height greater than a depth of the at least one groove, and a plurality of dough support layers, each dough support layer coextensive with an area formed by at least one of the shape and thickness templates.

In Example 22, the dough rolling kit of any one or more of Examples 1-21 optionally includes a rolling pin for rolling dough on the rolling board.

In Example 23, the dough rolling kit of any one or more of Examples 1-22 optionally includes a base and a guide pin or guide ring, wherein the interface of the base guide ring or guide pin, and the rolling board allow rotational movement of the rolling board relative to the base and limits lateral movement of the rolling board relative to the base.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A dough rolling system comprising:
    a rolling board having first and second major surfaces and a first plurality of grooves within the first major surface;
    a plurality of removable templates configured to insert within at least one groove of the first plurality of grooves, wherein the plurality of removable templates are configured to define a shape and a thickness for a final dough sheet.

2. The dough rolling system of claim 1, including a dough support layer coextensive with the shape of the final dough sheet, wherein the dough support layer is configured to support the final dough sheet when removed from the rolling board.

3. The dough rolling system of claim 1,
wherein a first groove of the plurality of grooves forms a first loop shape;
wherein a first removable template of the plurality of removable templates forms the first loop shape and is configured to fit within the first groove and to extend from a bottom of the first groove, below the first major surface, to a first height above the first major surface; and
wherein the first height defines a first thickness for the final dough sheet.

4. The dough rolling system of claim 3, wherein the first loop shape is a circle.

5. The dough rolling system of claim 3, wherein the first loop shape includes at least three sides and at least three corners.

6. The dough rolling system of claim 3, wherein the rolling board includes a second plurality of grooves within the second major surface;
wherein the first removable template is configured to fit within a first groove of the second plurality of grooves and to extend from a bottom of the first groove of the second plurality of grooves, below the second major surface, to a second height above the second major surface; and
wherein the second height defines a second thickness for the final dough sheet.

7. The dough rolling system of claim 1,
wherein the first plurality of grooves are straight;
wherein a plurality of length grooves of the first plurality of grooves define a length of the final dough sheet and a plurality of width grooves of the first plurality of grooves lie perpendicular to the plurality of length grooves and define a width of the final dough sheet.

8. The dough rolling system of claim 7, wherein a first removable template of the plurality of removable templates defines a square or rectangular shape and includes:
a base width bar configured to insert within a first groove of the plurality of width grooves;
a pair of length bars, each having a notch at a first end configured to interface with the base width bar, the pair of length bars configured to insert within a first length groove and a second length groove of the plurality of length grooves to define a length of the final dough sheet;
an adjustable width bar configured to insert into one width groove of a remaining plurality of width grooves not occupied by the base width bar and to define a width of the final dough sheet in association with the base width bar, and
wherein each of the pair of length bars include a plurality of notches, each notch of the plurality of notches associated with a particular width of the final dough sheet and configured to interface with a corresponding notch of the adjustable width bar for the particular width.

9. The dough rolling system of claim 8, wherein a height of each bar of the first removable template that extends above the first major surface when each bar is inserted within the first plurality of grooves determines the thickness of the final dough sheet.

10. The dough rolling system of claim 8, including a dough support layer coextensive with the length and the width of the final dough sheet, the dough support layer configured to support the final dough sheet while the final dough sheet is prepared and isolate dough from each of the remaining plurality of width grooves that are within the area defined by the base width bar, the pair of length bars and the adjustable width bar.

11. The dough rolling system of claim 2, wherein the rolling board includes a second plurality of grooves within the second major surface.

12. The dough rolling system of claim 11, wherein a first template of the plurality of removable templates is configured to define a first dough thickness when inserted within a first groove of the first plurality of grooves and to define a second dough thickness when inserted within a first groove of the second plurality of grooves; and
wherein the first dough thickness is different than the second dough thickness.

13. The dough rolling system of claim 2, wherein, except for the groves, the first major surface is substantially flat.

14. A dough rolling kit comprising;
a rolling board having a plurality of grooves extending in to the rolling board from a first major surface;
a plurality of shape and thickness templates, each shape and thickness template configured for insertion within at least one groove of the plurality of grooves, and each shape and thickness template having a height greater than a depth of the at least one groove; and
a plurality of dough support layers, each dough support layer coextensive with an area formed by at least one of the shape and thickness templates.

15. The dough rolling kit of claim 14, including a rolling pin for rolling dough on the rolling board.

* * * * *